United States Patent
Bajaj (10) Patent No.: US 11,863,429 B2
(45) Date of Patent: *Jan. 2, 2024

(54) NETWORK PATH SELECTION

(71) Applicant: Cisco Technology, Inc., San Jose, CA (US)

(72) Inventor: Sandeep Bajaj, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,162

(22) Filed: Mar. 6, 2023

(65) Prior Publication Data

US 2023/0208749 A1 Jun. 29, 2023

Related U.S. Application Data

(60) Division of application No. 17/667,319, filed on Feb. 8, 2022, now Pat. No. 11,611,503, which is a
(Continued)

(51) Int. Cl.
*G06F 15/173* (2006.01)
*H04L 45/00* (2022.01)
(Continued)

(52) U.S. Cl.
CPC .......... *H04L 45/22* (2013.01); *H04L 41/0859* (2013.01); *H04L 41/142* (2013.01);
(Continued)

(58) Field of Classification Search
None
See application file for complete search history.

(56) References Cited

U.S. PATENT DOCUMENTS

| 7,584,298 B2 | 9/2009 | Klinker et al. |
| 7,668,966 B2 | 2/2010 | Klinker et al. |

(Continued)

FOREIGN PATENT DOCUMENTS

| CN | 104335540 A | 2/2015 |
| CN | 105103504 A | 11/2015 |

(Continued)

OTHER PUBLICATIONS

International Preliminary Report on Patentability for International Application No. PCT/US2018/038025, dated Jan. 2, 2020, 11 pages.
(Continued)

*Primary Examiner* — Phuoc H Nguyen
(74) *Attorney, Agent, or Firm* — Polsinelli (57) ABSTRACT

A method may include monitoring a network performance metric for multiple paths to a destination through a network, and storing historical performance data for the paths. The method may also include receiving a data flow directed to the destination, where the data flow may be subject to a network performance agreement. The method may additionally include determining aggregate historical performances for the paths, and comparing the aggregate historical performances for the paths. The method may also include, based on the comparison of the aggregate historical performances, routing the data flow through the network.

20 Claims, 5 Drawing Sheets

Related U.S. Application Data continuation of application No. 16/580,132, filed on Sep. 24, 2019, now Pat. No. 11,245,616, which is a continuation of application No. 15/628,545, filed on Jun. 20, 2017, now Pat. No. 10,462,042.

(51) Int. Cl.
| | |
|---|---|
| *H04L 45/24* | (2022.01) |
| *H04L 41/0859* | (2022.01) |
| *H04L 41/16* | (2022.01) |
| *H04L 41/5051* | (2022.01) |
| *H04L 43/04* | (2022.01) |
| *H04L 41/142* | (2022.01) |
| *H04L 43/08* | (2022.01) |
| *H04L 41/5009* | (2022.01) |
| *H04L 43/10* | (2022.01) |
| *H04L 45/12* | (2022.01) |
| *H04L 45/64* | (2022.01) |
| *H04L 41/50* | (2022.01) |

(52) U.S. Cl.
CPC .......... *H04L 41/16* (2013.01); *H04L 41/5009* (2013.01); *H04L 41/5051* (2013.01); *H04L 43/04* (2013.01); *H04L 43/08* (2013.01); *H04L 45/24* (2013.01); *H04L 45/245* (2013.01); *H04L 41/5077* (2013.01); *H04L 43/10* (2013.01); *H04L 45/123* (2013.01); *H04L 45/14* (2013.01); *H04L 45/64* (2013.01); *H04L 45/70* (2013.01)

(56) References Cited

U.S. PATENT DOCUMENTS

| | | | |
|---|---|---|---|
| 7,843,843 B1 | 11/2010 | Papp, III et al. | |
| 7,864,706 B1 | 1/2011 | Zinjuwadia et al. | |
| 8,144,587 B2 | 3/2012 | Heinz et al. | |
| 8,811,172 B1 | 8/2014 | Sella | |
| 10,511,507 B2 * | 12/2019 | Attarwala | H04L 45/302 |
| 11,080,336 B2 | 8/2021 | Van Dusen | |
| 11,177,969 B2 * | 11/2021 | Taki | H04W 4/24 |
| 11,436,284 B1 * | 9/2022 | Merritt | G06N 20/20 |
| 2003/0086422 A1 | 5/2003 | Klinker et al. | |
| 2003/0088671 A1 | 5/2003 | Klinker et al. | |
| 2003/0133443 A1 | 7/2003 | Klinker et al. | |
| 2004/0008663 A1 | 1/2004 | Srikrishna et al. | |
| 2006/0159020 A1 | 7/2006 | Porat | |
| 2011/0238855 A1 | 9/2011 | Korsunsky et al. | |
| 2012/0089885 A1 | 4/2012 | Grube et al. | |
| 2013/0275567 A1 | 10/2013 | Karthikeyan et al. | |
| 2014/0094208 A1 | 4/2014 | Egner et al. | |
| 2015/0063122 A1 | 3/2015 | Chiang et al. | |
| 2016/0218963 A1 | 7/2016 | Nauck et al. | |
| 2016/0285752 A1 | 9/2016 | Joshi | |
| 2018/0019939 A1 | 1/2018 | Finkelstein | |
| 2018/0191622 A1 | 7/2018 | Karthikeyan et al. | |

FOREIGN PATENT DOCUMENTS

| | | |
|---|---|---|
| WO | 2013144550 | 10/2013 |
| WO | 2015175260 | 11/2015 |

OTHER PUBLICATIONS

International Search Report and Written Opinion from the International Searching Authority, dated Sep. 24, 2018, 12 pages, for the corresponding International Patent Application PCT/US2018/038025.

* cited by examiner

NETWORK PATH SELECTION

CROSS-REFERENCE TO RELATED APPLICATIONS

This application is a Divisional of U.S. patent application Ser. No. 17/667,319, filed on Feb. 8, 2022, which in turn, is a continuation of U.S. patent application Ser. No. 16/580,132, filed Sep. 24, 2019, now U.S. Pat. No. 11,245,616, which is a continuation of U.S. patent application Ser. No. 15/628,545, filed Jun. 20, 2017, now U.S. Pat. No. 10,462,042, the contents of which are herein incorporated by reference in their entireties.

FIELD

The embodiments discussed in the present disclosure are related to improved network path selection.

BACKGROUND

The use of networks is a useful tool in allowing communication between distinct computing devices. Some network traffic may be subject to agreements or requirements of an expected level of service for the network traffic. Such agreements or requirements are sometimes referred to as "service level agreements" (SLAs).

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method that includes monitoring one or more network performance metrics for a first path to a destination through a network and a second path to the destination through the network. The method may also include storing historical performance data of the network performance metrics of the first path and the second path. The method may additionally include receiving a data flow directed to the destination, where the data flow may be subject to a network performance agreement based on at least one of the network performance metrics. The method may also include determining that a first aggregate historical performance is higher than a second aggregate historical performance, where the first aggregate historical performance may be based on the stored historical performance data of the first path and the second aggregate historical performance may be based on the stored historical performance data of the second path. The method may additionally include, based on the first aggregate historical performance being higher than the second aggregate historical performance, routing the data flow along the first path.

One or more embodiments of the present disclosure may include a method that includes monitoring a network performance metric for multiple paths to a destination through a network, and storing historical performance data for the paths. The method may also include receiving a data flow directed to the destination, where the data flow may be subject to a network performance agreement. The method may additionally include determining aggregate historical performances for the paths, and comparing the aggregate historical performances for the paths. The method may also include, based on the comparison of the aggregate historical performances, routing the data flow through the network.

One or more embodiments of the present disclosure may additionally include systems and/or non-transitory computer readable media for facilitating the performance of such methods.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments of the present disclosure relate to improvements to the selection of network paths. For example, when receiving a data flow subject to an SLA with multiple potential paths for reaching the destination, the network device decides which of the paths is to be used to route the data flow to the destination. An SLA may include an agreed upon threshold level for one or more network performance metrics, such as bandwidth, availability, jitter, latency, loss, and/or others.

Rather than only considering a most recent snapshot of network path performance, in some embodiments of the present disclosure, the network device may consider the historical performance of the various paths relative to the SLA when deciding which path the data flow is to be routed along. For example, the network device may consider a number of times that each of the potential paths dropped below the SLA for a given time period, and select the path with the best performance. In some embodiments, a machine learning algorithm may be used to compare the historical performance of the various paths. Such a machine learning algorithm may include multiple factors (e.g., jitter, latency, loss, cost, carrier reputation, etc.) considered and continually refined over time. By using the historical performance and/or other factors, a selection may be made to find a path that is more likely to satisfy the SLA of a data flow, rather than simply selecting a path based on the most recent snapshot.

Embodiments of the present disclosure may provide improvements to computer networks and to the operation of computers themselves. For example, the performance of applications utilizing SLAs may be improved because a path more likely to satisfy the performance of the SLA may be used for the application, allowing for increased response times and increased application performance. Additionally, network traffic may flow with increased performance by selecting paths that are more likely to satisfy SLAs of data flows. For example, using embodiments of the present disclosure may be more likely to place network traffic on more reliable paths, causing less retransmission of data. By providing for fewer retransmissions, valuable network resources such as bandwidth may be preserved, and increased response times may be provided. Additionally, because of the reduced number of retransmissions, the amount of traffic flowing through the internal network domain may be reduced, providing superior performance for the internal network domain. Another advantage in which the present disclosure may include cost savings as one factor in selecting a path may include considering costs associated with a particular path in the path selection process.

Embodiments of the present disclosure are explained with reference to the accompanying drawings.

Figure 1:
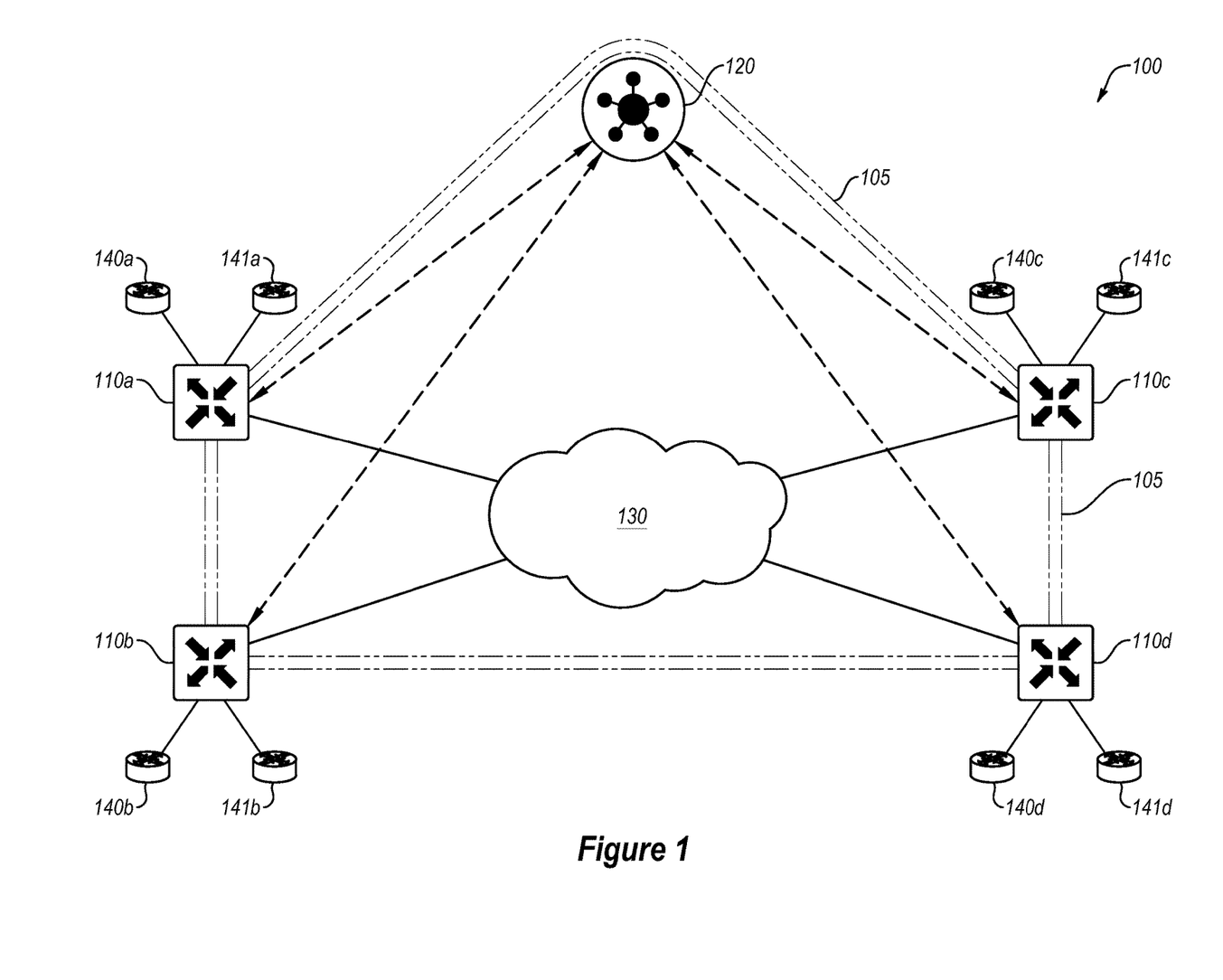
FIG. 1 illustrates an example system of network components implementing a software-defined network.

FIG. 1 illustrates an example system 100 of network components implementing a software-defined network, in accordance with one or more embodiments of the present disclosure. In some embodiments, the network path selection may be implemented in a software-defined network such as that illustrated by the system 100. The system 100 may include an internal network domain 105 and one or more external network domains. The system 100 may include one or more edge network devices 110 (such as the edge network devices 110a-110d), a control device 120, a communication network 130, and external network devices 140 and 141 (such as the external network devices 140a-140d and 141a-141d).

The system 100 may implement a software-defined network. A software-defined network may include a network that is managed by software rather than controlled by hardware. As such, a software-defined network may support multiple types of connections, such as the Internet, Multi-Protocol Label Switching (MPLS) connections, and/or cellular connections (such as Long Term Evolution (LTE), LTE Advanced, Worldwide Interoperability for Microwave Access (WiMAX), 4G, and/or others). Additionally, a software-defined network may support load balancing or load sharing between the various connections. Further, because of the distributed nature of a network, a software defined network may support virtual private networks (VPNs), firewalls, and other security services. In a software-defined network, for example, a control plane may be functionally separated from the physical topology. In some embodiments, a software-defined network may separate the control plane of the network (to be managed via software) from a data plane of the network (operating on the hardware of the network). As used herein, the term control plane may refer to communications and connections used in the control and administration of a network itself, rather than the transmission of data through the network, which may occur at the data plane. As used herein, the term data plane may refer to communications and connections used in the transmission and reception of data through the network. For example, the control plane may include administrative traffic directed to a network device within a network, while the data plane may include traffic that passes through network devices within the network.

In some embodiments, a software-defined network may be implemented as a software-defined wide area network (SD-WAN), local area network (LAN), metropolitan area network (MAN), among others. While one or more embodiments of the network path selection may be described in the context of an SD-WAN, such embodiments may also be implemented in any network.

In some embodiments, the control device 120 may be configured to manage the control plane of an internal network domain 105 by directing one or more aspects of the operation of the edge network devices 110. For example, the control device 120 may generate and/or distribute policies to one or more of the edge network devices 110. A policy may include a rule or set of rules bearing on the handling of network traffic, such as routing, priority, media, etc. In some embodiments, the policies may include SLAs for various data flows. For example, data flows associated with a video application may have an SLA that the data flow be routed along a path with latency below a first threshold, and data flows associated with a voice transmission application may have an SLA that the data flow be routed along a path with loss below a first threshold and jitter below a second threshold.

The internal network domain 105 may operate as a secured and controlled domain with specific functionality and/or protocols. In some embodiments, the edge network devices 110 may operate based on one or more policies created and/or propagated by the control device 120. In these and other embodiments, the edge network devices 110 may route data traffic within the internal network domain 105 based on the policies created and/or propagated by the control device 120.

In some embodiments, an edge network device (e.g., the edge network device 110a) may receive a data flow to be routed to another edge network device (e.g., the edge network device 110d). The edge network device 110a may determine that the data flow is subject to an SLA and that there are multiple potential paths for the edge network device 110a to route the traffic to the edge network device 110d. The edge network device 110a may consider the historical performance of the various paths in determining which path is to be used for the data flow. Such a path selection determination may be described with greater detail in FIGS. 2-4.

In some embodiments, the control device 120 may form a control plane connection with each of the edge network devices 110. The control plane connection may facilitate the exchange of management data between the edge network devices 110 and the control device 120 for management and control of the internal network domain 105. The control plane connection may operate as a tunnel through the communication network 130, such as a Datagram Transport Layer Security (DTLS) tunnel. In some embodiments, data transmitted over the control plane connection may facilitate the control device 120 determining topology of the communication network 130. For example, the control device 120 may communicate with the edge network devices 110 to determine what physical connections exist between and among the edge network devices 110 in the communication network 130. Additionally or alternatively, data transmitted over the control plane connection may facilitate the control device 120 determining optimal or desired paths across the communication network 130 between and among the edge network devices 110. Such communications may facilitate path selection. Additionally or alternatively, the control device 120 may communicate route information to the edge network devices 110 over the control plane connection. In these and other embodiments, the control plane connection may include a permanent connection between the control device 120 and the edge network devices 110 such that if the connection between the control device 120 and a given edge network device 110 is broken, the edge network device 110 may be unable or otherwise disallowed from communicating over the internal network domain 105.

In some embodiments, the control device 120 may maintain a central route table that stores route information within the internal network domain 105. For example, the control device 120 may communicate with various edge network devices 110 to determine the physical connections available to the edge network devices 110 through the communication network 130. In some embodiments, the edge network devices 110 may include one or more physical connections to each other. In these and other embodiments, the control device 120 may generate and/or update one or more policies in conjunction with the central route table to determine paths through the internal network domain 105, and may communicate those paths to the edge network devices 110. In at least one embodiment, the control device 120 may provide policies and other categorical rules related to data flows to the edge network devices 110 rather than being involved with every individual flow through the internal network domain 105.

In these and other embodiments, the edge network devices 110 may not have stored the topology and/or route paths of the entire system 100. Each of the edge network devices 110 may not need to query each other individually to determine reachability. Instead, the control device 120 may provide such information to the edge network devices 110. Additionally or alternatively, a subset of the reachability and/or infrastructure information may be provided to the edge network devices 110, for example, based on one or more policies of the control device 120.

In network path selection decisions, if the network traffic is a data flow subject to an SLA, the edge network device 110 performing the path selection decision may consider the historical performance of the various potential paths over the connections through the internal network domain 105.

In addition to generating policies to guide the edge network devices 110 in making path selection decisions, the control device 120 may generate other policies that are to be followed by the edge network devices 110. In some embodiments, the control device 120 may generate policies to cause certain network traffic flows within the internal network domain 105 to be routed over certain types of connections (e.g., LTE, MPLS) and/or through certain edge network devices 110. For example, the control device 120 may check the central route table and determine that a direct connection exists between the edge network device 110a and the edge network device 110c. Rather than allowing data to be routed directly between the edge network device 110a and the edge network device 110c, the control device 120 may generate a policy to instead cause the data to be routed through the edge network device 110d. For example, the data may be routed through the edge network device 110d for various reasons, such as because the edge network device 110d may include a firewall, data filter, security feature, data loss prevention (DLP) feature, export control, or government compliance feature, among others. As another example, the control device 120 may generate a policy to cause one or more of the edge network devices 110 to route traffic through an edge network device 110 associated with a data center, for example, because the data center includes a firewall, data filter, etc. Using such an approach, the flow of traffic within the internal network domain 105 may be readily controlled and guided based on policies and traffic routes propagated by the control device 120 to the edge network devices 110.

The edge network devices 110 may operate at a boundary of the internal network domain 105. The edge network devices 110 may include one or more physical and/or logical connections that may operate within the internal network domain 105. Such connections may be illustrated as part of the communication network 130. Additionally or alternatively, the edge network devices 110 may include one or more physical and/or logical connections operating outside of the internal network domain 105. For example, the edge network devices 110 may be connected to the external network device(s) 140 and/or 141.

In some embodiments, the edge network devices 110 may operate to route traffic from associated external network devices 140 and 141 into the internal network domain 105. Additionally or alternatively, the edge network devices 110 may operate to route traffic from the internal network domain 105 to the associated external network devices 140 and 141. In some embodiments, the edge network devices 110 may communicate with associated external network devices 140 and 141 using typical communication protocols, such as Open Shortest Path First (OSPF), Border Gateway Protocol (BGP), Virtual Router Redundancy Protocol (VRRP), and Bi-directional Forwarding Detection (BFD), among others. Additionally or alternatively, the edge network devices 110 may support other network functionalities such as Virtual Local Area Network (VLAN) tagging, Quality of Service (QoS) monitoring, Internet Protocol (IP) forwarding, Internet Protocol Security (IPsec), Access Control Lists (ACL), among others.

For example, with QoS monitoring, the edge network devices 110 may provide for one or more network performance metrics that may be monitored, such as jitter, bandwidth, error rate, bit rate, throughput, and/or others. In some embodiments, the edge network devices 110 may monitor the network performance metrics by periodically transmitting a message to measure the one or more network performance metrics. Such messages may take any format, such as an internet control message protocol (ICMP) echo probe, a jitter probe, a transmission control protocol (TCP) probe, a user datagram protocol (UDP) echo probe, etc. In these and other embodiments, the monitoring messages may be sent at any frequency, such as every thirty seconds, every sixty seconds, every two minutes, every five minutes, every ten minutes, etc. Additionally or alternatively, the monitoring probes may be sent in response to one or more events. In some embodiments, the frequency of such messages may be sent at a decreased frequency when no traffic is flowing and/or may be sent at an increased frequency when traffic is flowing along a path.

In some embodiments, the edge network devices 110 may locally maintain one or more local route tables. In some embodiments, the edge network devices 110 may adjust or modify the local route tables based on one or more policies sent from the control device 120. For example, one or more entries may be removed, discarded, or otherwise not added to the local route tables by the edge network devices 110 based on the one or more policies. In some embodiments, the edge network devices 110 may include logic to update, modify, and/or generate the local route tables based on traffic handled by the edge network devices 110. The one or more local route tables may be automatically populated by the edge network devices 110 based on direct interface routes, static routes, and/or dynamic routes learned using one or more network protocols such as BGP and/or OSPF. In some embodiments, routing decisions for data outside of the internal network domain 105 may be performed by a particular edge network device 110 without specific direction, input, or control from the control device 120. For example, the particular edge network device 110 may select a path based on the one or more policies that the particular edge network device 110 has received from the control device 120, with reference to the local route table of the particular edge network device 110, and/or based on historical performance of the paths.

In some embodiments, one or more of the edge network devices 110 and/or the control device 120 may be implemented as one or more virtual machines operating on one or more physical computing devices. Additionally or alternatively, the edge network devices 110 and/or the control device 120 may each include an individual stand-alone computing device.

Modifications, additions, or omissions may be made to FIG. 1 without departing from the scope of the present disclosure. For example, while illustrated as including four edge network devices 110 and one control device 120, the system 100 may include any number of edge network devices 110 and control devices 120, such as thousands or tens of thousands of edge network devices 110 and more than five control devices 120. As another example, as illustrated as a single communication network 130, the communication network 130 may include multiple types of communication connections.

Figure 2:
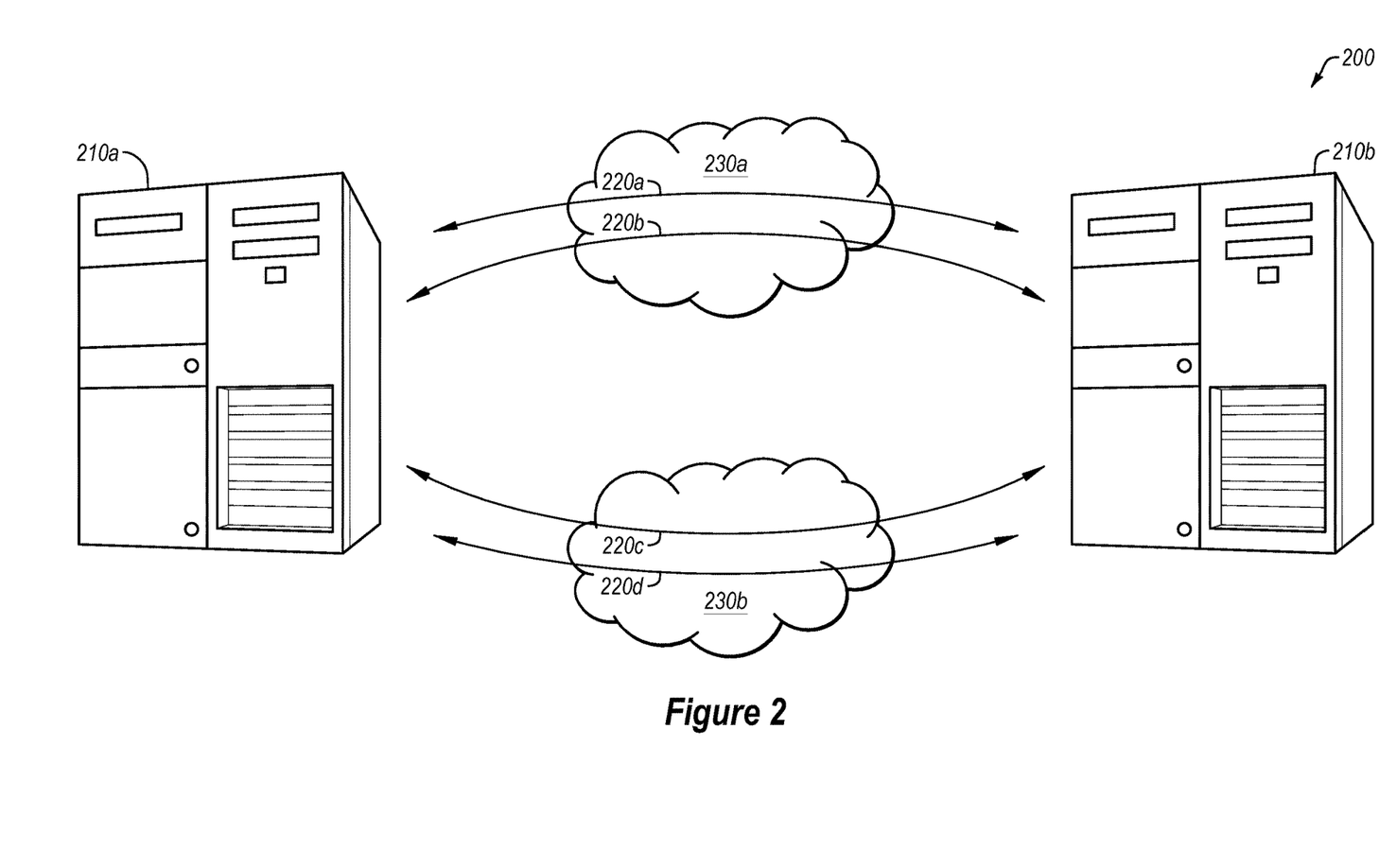
FIG. 2 illustrates an example system with multiple paths between network devices.

FIG. 2 illustrates an example system 200 with multiple paths between network devices 210, in accordance with one or more embodiments of the present disclosure. The network devices 210 (such as a first network devices 210*a* and a second network device 210*b*) may be configured to route data flows through one or more networks 230 (such as a first network 230*a* and a second network 230*b*). There may be multiple paths 220 between the first and second network devices 210*a* and 210*b* (such as a first path 220*a* and second path 220*b* through the first network 230*a*, and a third path 220*c* and a fourth path 220*d* through the second network 230*b*).

The network devices 210*a-b* may include any device or system configured to receive a data flow to be routed through one or more of the networks 230*a-b*, and route the data flow through one or more of the networks 230*a-b*. For example, the network devices 210*a-b* may be implemented as an edge network device 110 of FIG. 1. In some embodiments, the network devices 210*a-b* may receive the data flow from one or more electronic devices (not illustrated).

In some embodiments, the network devices 210*a-b* may monitor the network performance of the paths 220*a-d* through the networks 230*a-b*. For example, the first network device 210*a* may periodically send probes or other messages through the networks 230*a-b* to measure the network performance of various metrics (such as QoS metrics) for the various paths. Additionally or alternatively, the network devices 210*a-b* may store data regarding the performance of the paths 220*a-d*. Such stored network performance may be referred to as historical performance data. The historical performance data may be maintained locally, and/or may be communicated to a central device (such as the control device 120 of FIG. 1).

Figure 3:
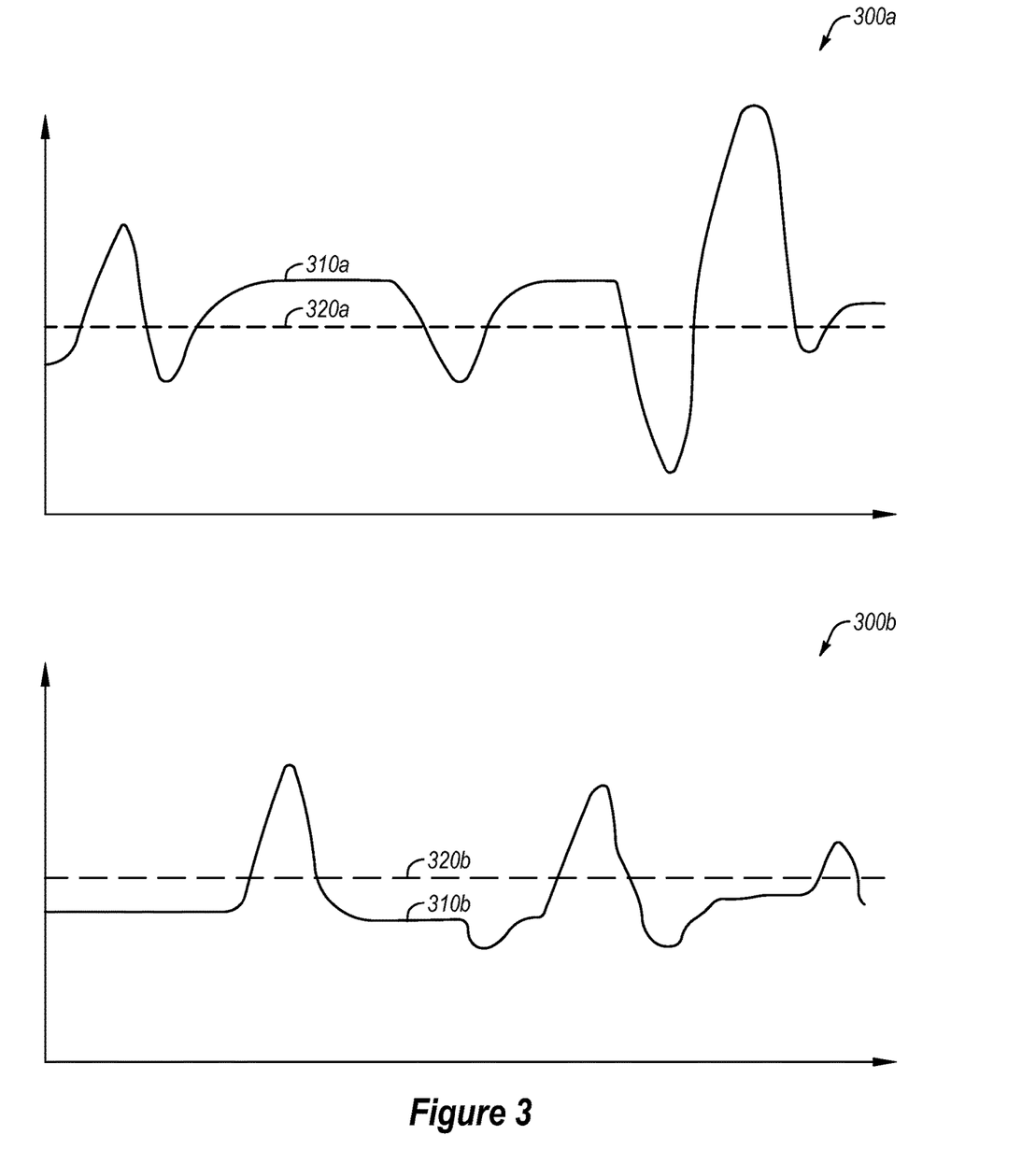
FIG. 3 illustrates example charts of network performance metrics over time.

After receiving a data flow at the first network device 210*a* directed to the second network device 210*b*, the first network device 210*a* may determine which of the paths 220*a-d* to use to rout the data flow to the second network device 210*a*. For example, if the data flow is subject to an SLA, the first network device 210*a* may determine whether any of the paths 220*a-d* comply with the SLA. For example, the first network device 210*a* may observe, look-up, request, or otherwise obtain the most recent historical performance data associated with the SLA for the various paths 220*a-d*. If only one path satisfied the network performance metrics associated with the SLA, the first network device 210*a* may route the data flow along that path. However, if multiple paths satisfied the SLA network performance metrics, the historical performance of those paths (or all possible paths) may be considered. Additionally or alternatively, if none of the paths satisfied the SLA performance metrics, the historical performance of all of the paths 220*a-d* may be considered. Any of a variety of aspects of the historical performance of the paths 220*a-d* may be utilized to determine which path is to carry the data flow. FIG. 3 may illustrate various examples of historical performance data and may be used to articulate examples of such aspects of the historical performance.

FIG. 3 illustrates example charts 300*a* and 300*b* of historical performance over time, and may be used to describe various aspects of historical performance and how they may affect path selection. The charts 300*a* and 300*b* may include historical performance data 310*a* and 310*b*, and SLA thresholds 320*a* and 320*b*. For example, the chart 300*a* illustrates that the historical performance data 310*a* has four regions completely above the SLA threshold 320*a*, and the most recent historical performance data point was above the threshold 320*a*. In some embodiments, compliance with an SLA may include being above the thresholds 320*a* and/or 320*b*, below the thresholds 320*a* and/or 320*b*, and/or between the thresholds 320*a* and/or 320*b* and another threshold (not illustrated). The examples of the various aspects of historical performance will be described in terms of exceeding the threshold as being the agreed performance relative to the SLA.

One example aspect of historical performance may include a number of instances during a given duration of time that the historical performance data dropped below the threshold 320. Such a determination may count the act of going from above the threshold 320 to below the threshold 320, although other mechanisms for such a determination may be used. In the chart 300*a*, the historical performance data 310*a* dropped below the threshold 320*a* four times. In the chart 300*b*, the historical performance data 310*b* dropped below the threshold 320*b* three times. Thus, in these and other embodiments, the path represented by the chart 300*b* may be more desirable than the path represented by the chart 300*a* because the historical performance data of that path dropped below the threshold 320 less frequently.

Another example aspect of historical performance may include a duration of time that the historical performance data 310 was below the threshold for a given span of time. For example, in the chart 300*a*, the historical performance data 310*a* is below the threshold for short durations. In contrast, in the chart 300*b*, the historical performance data 310*b* is below the threshold for extended durations. Thus, in these and other embodiments, the path represented by the chart 300*a* may be more desirable than the path represented by the chart 300*b* because that path spent less time below the threshold 320.

Returning to FIG. 2, another example aspect of historical performance may include considerations of the carrier of the path. For example, if the first path 220*a* and the second path 220*b* were provided by a first carrier that provided the first network 230*a*, and the third path 220*c* and the fourth path 220*d* were provided by a second carrier that provided the second network 230*b*, the performance and/or reputation of the first and second carriers may be used in path selection. For example, the historical performance data of both the first path 220*a* and the second path 220*b* (and/or any other connections in the first network 230*a*) may be combined into carrier historical performance data for the first carrier. The same may be done for the third and fourth paths 220*c* and 220*d* in the second network 230*b* for the second carrier. Additionally, other reputation, performance, opinion, etc. data of the first carrier may be included in the path selection.

The charts 300*a* and 300*b* may be illustrative of an example of the carrier historical performance data for the first and second carriers.

Another example aspect that may be included in the path selection may be the cost associated with using a certain path. For example, if the first network 230*a* is more expensive than the second network 230*b* to carry data, the path selection decision may favor the less expensive paths through the second network 230*b*.

In some embodiments, determining a path based on the historical performance may include the use of analytics such as a machine learning algorithm or other analytics in determining the path. In some embodiments, the analytics may yield a given score for a path based on the analyzed historical performance and may represent an aggregate historical performance for a path. For example, the first network device 210*a* may look at the score when performing path selection for the data flow rather than performing a historical data analysis each time a data flow is received. In some embodiments, the score may continually be refined over time.

In some embodiments, the analytics to determine the aggregate historical performance may include a machine learning algorithm. One example of a machine learning algorithm consistent with the present disclosure may include a random forest algorithm where the variables in the algorithm may include one or more of the aspects of the historical performance, such as how many times the historical performance data dropped below the threshold, how long the historical performance data dropped below the threshold, and/or the reputation of the carrier of the path. In these and other embodiments, multiple aspects of the historical performance may be included in generating the aggregate historical performance, or in performing the path selection.

For example, for a random forest algorithm, multiple decision trees to characterize performance of a given path as a score may be generated. The decision trees may include a set of variables being considered (e.g., duration of time below threshold, number of times crossing threshold, cost, carrier reputation, etc.) and an expected score for the given combination of variables. The decision trees may be generated based on random groupings of such known combinations of variables and their corresponding scores. The multiple decision trees may be used to analyze historical performance data of paths. For example, historical performance data for a path to be analyzed may be passed through the decision trees to generate a score for each of the decision trees. A common or average score between the decision trees may be used to provide a score for the path. In some embodiments, the historical performance data may be analyzed using the decision trees when a data flow is received, when a probe measuring network performance returns, periodically, or on any other bases. In some embodiments, the score may be stored such that when a network device performs a path selection decision, the score may be already generated such that the network device obtains the score and compares it to the scores of other potential paths in performing the path selection. While a random forest algorithm is described, any other machine learning, analytics, or other analysis may be performed to compare the historical performance of the paths to select a path for a data flow subject to an SLA.

In some embodiments, the aggregate historical performance may include a weighting factor for one or more data points of the historical performance. For example, the more recent historical performance data points may be weighted more heavily than more distant in the past data points. In these and other embodiments, the weighting factor may include a half-life or other decay function such that certain data points become less and less impactful, and/or eventually have no impact on the aggregate historical performance. In some embodiments, a cutoff point may be used in deciding which data points of the historical performance are used in determining the aggregate historical performance. For example, such a cutoff point may focus the aggregate historical performance on a certain number of recent data points of the historical performance, or a certain duration of time of data points that may be used to contribute to the aggregate historical performance.

In some embodiments, the aggregate historical performance may be based on near term historical performance (e.g., within a certain time period such as within the last week, last two weeks, or last month), long term historical performance (e.g., older than within a certain time period, such as older than a week, older than two weeks, or more than a month old), or a combination of both.

Modifications, additions, or omissions may be made to FIGS. 2 and/or 3 without departing from the scope of the present disclosure. For example, while illustrated as including two network devices 210*a-b*, the system 200 may include any number of network devices. As another example, as illustrated as four paths 220*a-d*, any number of paths over any number of networks may be included.

Figure 4:
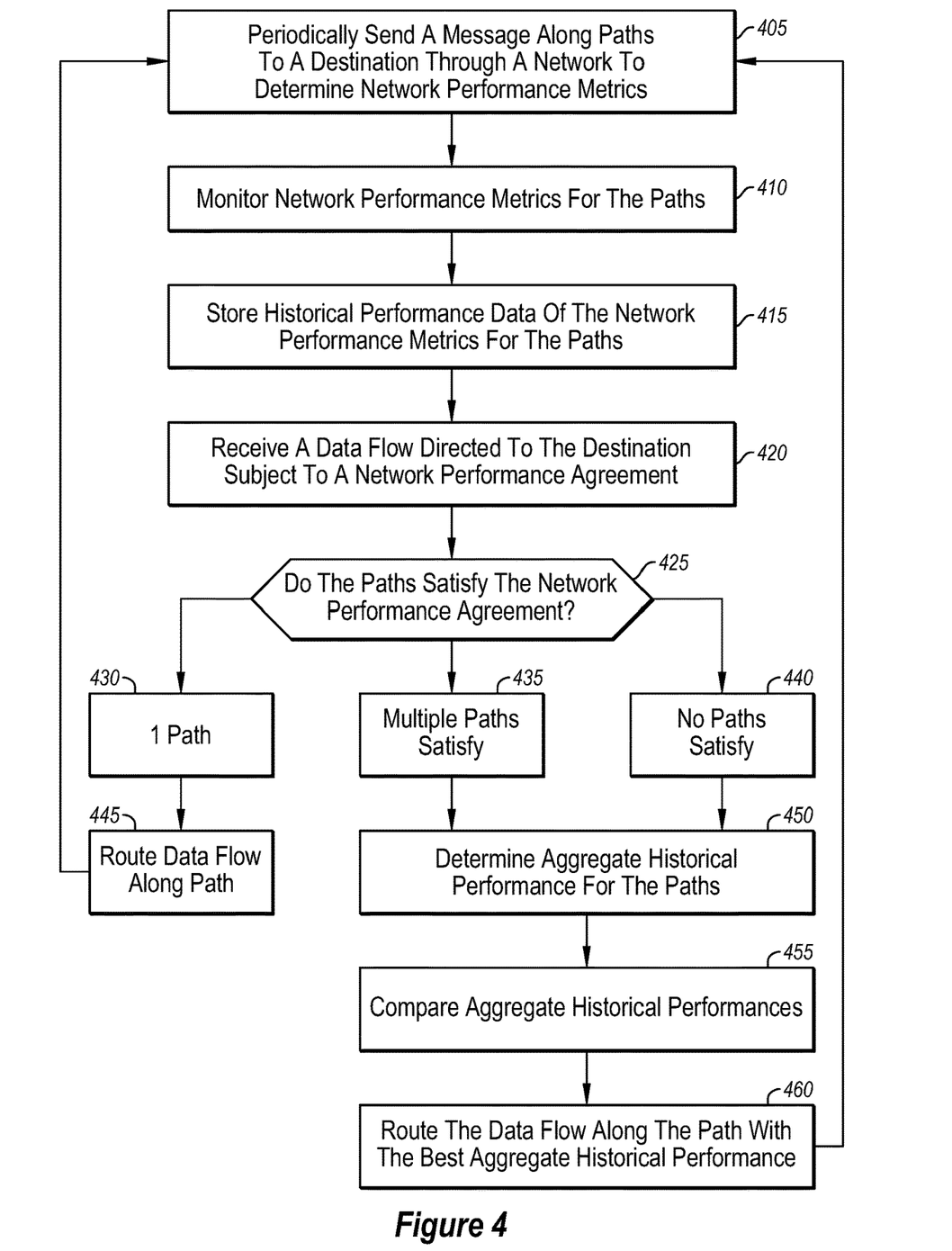
FIG. 4 illustrates a flowchart of an example method of selecting a path over which to route a data flow.

FIG. 4 illustrates a flowchart of an example method 400 of selecting a path over which to route a data flow, in accordance with one or more embodiments of the present disclosure. Although illustrated as discrete blocks, various blocks may be divided into additional blocks, combined into fewer blocks, or eliminated, depending on the particular implementation.

At block 405, a message may be periodically sent along one or more paths to a destination to determine network performance metrics for the paths. For example, a network device (such as the first network device 210*a* of FIG. 2) may periodically send a probe to determine jitter, latency, loss, etc. of various paths (such as the paths 220*a-d*) through the network (such as the networks 230*a-b* of FIG. 2) to other network devices (such as the second network device 210*b* of FIG. 2).

At block 410, the network performance metrics for the paths may be monitored. For example, the network device may observe or otherwise perform one or more calculations or analyses on the messages of the block 405 to determine and/or monitor the network performance metrics of the paths.

At block 415, historical performance data of the network performance metrics for the paths may be stored. For example, the network device may locally store the historical performance data of the various paths. Additionally or alternatively, the network device may communicate the performance data to a centralized device such as the control device 120 of FIG. 1.

At block 420, a data flow directed to the destination may be received. The data flow may be subject to a network performance agreement, such as an SLA. For example, the network device may receive a data flow where a policy or other rule designates the data flow as being subject to an SLA.

At block 425, a determination may be made as to whether the paths satisfy the network performance agreement. For example, the network device may observe a most recent point of the historical performance data for the paths to determine the number, if any, of paths that satisfy the SLA. If only one path satisfies the agreement (block 430), the method 400 may proceed to the block 445. If multiple paths satisfy the agreement (block 435), the method 400 may proceed to the block 450. If no paths satisfy the agreement (block 440), the method 400 may proceed to the block 450.

At block 445, after determining that one path satisfies the network performance agreement at the block 425, the data flow may be routed along the one path that satisfies the network performance. After routing the data flow along the path that satisfies the network performance, the method 400 may return to the block 405.

At block 450, after determining that either multiple paths satisfy the network performance agreement (block 435), or that no paths satisfy the network performance agreement (block 440), aggregate historical performance for the paths may be determined. In some embodiments, determining the aggregate historical performance for the paths may include using analytics or a machine learning algorithm to combine historical performance data for the various paths into the aggregate historical performance. The analytics may be based on any number of aspects of the historical performance data, such as a number of times that the performance dropped below a threshold level for the metric of the SLA, or a duration of time that the performance dropped below the threshold level for the metric of the SLA. Additionally or alternatively, one or more features of the carrier or provider of the network may be included in determining the aggregate historical performance. In some embodiments, the aggregate historical performance may be represented by a score.

At block 455, the aggregate historical performances for the various paths may be compared. For example, if the aggregate historical performances are represented by scores, the network device may compare the scores of the various paths.

At block 460, the data flow may be routed along the path with the best aggregate historical performance. Additionally or alternatively, the data flow may be routed along one or more paths with aggregate historical performances above a threshold. Thus, the path more likely to satisfy the SLA may be used because of the consideration of historical performance of the paths. In some embodiments, if multiple paths have the same aggregate historical performance, the network device may identify multiple paths as the path to use and may route the data flow using a multi-path routing protocol, such as equal-cost multi-path (ECMP) routing. After the block 460, the method 400 may return to the block 405.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 5:
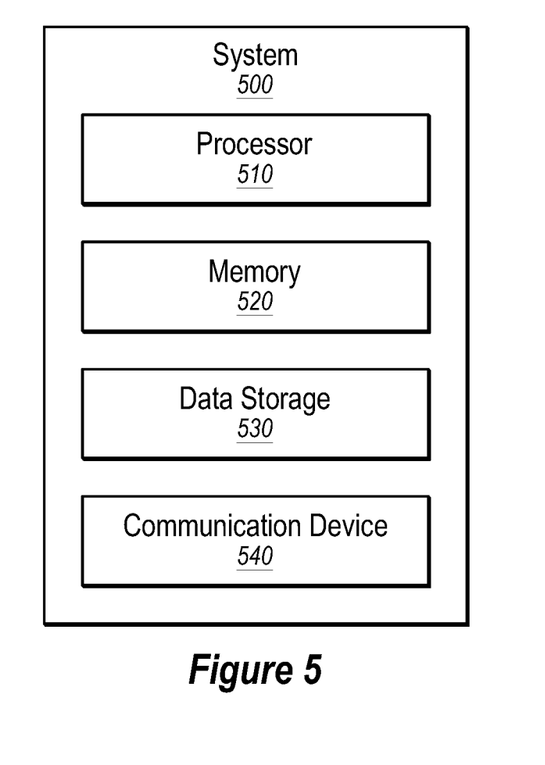
FIG. 5 illustrates an example computing system.

FIG. 5 illustrates an example computing system 500, according to at least one embodiment described in the present disclosure. The system 500 may include any suitable system, apparatus, or device configured to select a path over which to route a data flow, or facilitate such path selection. The computing system 500 may include a processor 510, a memory 520, a data storage 530, and a communication unit 540, which all may be communicatively coupled. In some embodiments, any of the network devices (e.g., the edge network devices 110 of FIG. 1 or the network devices 210 of FIG. 2), or other computing devices of the present disclosure may be implemented as the computing system 500. Additionally or alternatively, one or more of the network devices or other computing devices may be implemented as virtualized machines operating on a physical computing system such as the computing system 500.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include any number of processors distributed across any number of network or physical locations that are configured to perform individually or collectively any number of operations described in the present disclosure. In some embodiments, the processor 510 may interpret and/or execute program instructions and/or process data stored in the memory 520, the data storage 530, or the memory 520 and the data storage 530. In some embodiments, the processor 510 may fetch program instructions from the data storage 530 and load the program instructions into the memory 520.

After the program instructions are loaded into the memory 520, the processor 510 may execute the program instructions, such as instructions to perform the method 400 of FIG. 4. For example, the processor 510 may determine that a data flow is associated with an SLA and may select a path for the data flow based on the historical performance of the path.

The memory 520 and the data storage 530 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 510. In some embodiments, the computing system 500 may or may not include either of the memory 520 and the data storage 530.

By way of example, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations.

The communication unit 540 may include any component, device, system, or combination thereof that is configured to transmit or receive information over a network, such as an MPLS connection, the Internet, a cellular network (e.g., an LTE network), etc. In some embodiments, the communication unit 540 may communicate with other devices at other locations, the same location, or even other components within the same system. For example, the communication unit 540 may include a modem, a network card (wireless or wired), an optical communication device, an infrared communication device, a wireless communication device (such as an antenna), a chipset (such as a Bluetooth device, an 802.6 device (e.g., Metropolitan Area Network (MAN)), a WiFi device, a WiMax device, cellular communication facilities, or others), and/or the like, or any combinations thereof. The communication unit 540 may permit data to be exchanged with a network and/or any other devices or systems described in the present disclosure. For example, the communication unit 540 may allow the system 500 to communicate with other systems, such as network devices, control devices, and/or other networks.

Modifications, additions, or omissions may be made to the system 500 without departing from the scope of the present disclosure. For example, the data storage 530 may include multiple different storage mediums located in multiple locations and accessed by the processor 510 through a network.

As indicated above, the embodiments described in the present disclosure may include the use of a special purpose or general purpose computer (e.g., the processor 510 of FIG. 5) including various computer hardware or software modules, as discussed in greater detail below. Further, as indicated above, embodiments described in the present disclosure may be implemented using computer-readable media (e.g., the memory 520 or data storage 530 of FIG. 5) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases at least one and one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one ore more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
monitoring a network performance metric for a first path to a destination through a network and a second path to the destination through the network, the network performance metric associated with an application, the application being subject to a service level agreement based on the monitored network performance metric;
storing historical performance data for the first path and for the second path based on the monitored network performance metric of the first path and the second path;
receiving a data flow associated with the application and directed to the destination;
determining whether the first path and the second path satisfy the service level agreement associated with the application;
selecting the first path or the second path based on the historical performance data for the first second path; and
routing the data flow associated with the application to the destination along the selected path, wherein the first path or the second path is selected in response to a determination that neither the first path nor the second path satisfy the service level agreement.

2. The method of claim 1, wherein the first path or the second path is selected based on a score associated with the historical performance data for the first path being higher than the score associated with the historical data for the second path.

3. The method of claim 1, wherein the network performance metric comprises jitter.

4. The method of claim 1, wherein the network performance metric comprises latency.

5. The method of claim 1, wherein the network performance metric comprises packet loss.

6. The method of claim 1, further comprising periodically sending a message along the first path to measure one or more network performance metrics of the first path.

7. The method of claim 1, wherein the first path or the second path is selected by:
determining an aggregate historical performance for the first and the second paths;
comparing the aggregate historical performance; and
selecting the path with aa highest aggregated historical performance.

8. A system comprising:
a destination network device; and
a routing network device, the destination network device reachable from the routing network device over a first path and a second path through a network, the routing network device comprising:
one or more non-transitory computer readable media storing instructions; and
one or more processors configured to execute the instructions to cause the system to perform operations comprising:
monitoring a network performance metric for the first path and the second path, the network performance metric associated with an application, the application being subject to a service level agreement based on the monitored network performance metric;
storing historical performance data for the first path and the second path based on the monitored network performance metric of the first path and the second path;
receiving a data flow associated with the application and directed to the destination network device;
determining whether the first path and the second path satisfy the service level agreement associated with the application;
selecting the first path or the second path based on the historical performance data for the first path and the historical data for the second path; and
routing the data flow associated with the application to the destination network device along the selected path, wherein the first path or the second path is selected in response to a determination that neither the first path nor the second path satisfy the service level agreement.

9. The system of claim 8, wherein the first path or the second path is selected based on a score associated with the historical performance data for the first path being higher than the score associated with the historical data for the second path.

10. The system of claim 8, wherein the network performance metric comprises jitter.

11. The system of claim 8, wherein the network performance metric comprises latency.

12. The system of claim 8, wherein the network performance metric comprises packet loss.

13. The system of claim 8, further comprising periodically sending a message along the first path to measure one or more network performance metrics of the first path.

14. The system of claim 8, wherein the first path or the second path is selected by operations comprising:
determining an aggregate historical performance for the first and the second paths;
comparing the aggregate historical performance; and
selecting the path with aa highest aggregated historical performance.

15. One or more non-transitory computer readable media storing instructions, which when executed by one or more processors, cause the one or more processors to perform operations comprising:
monitoring a network performance metric for a first path and a second path, the network performance metric associated with an application, the application being subject to a service level agreement based on the monitored network performance metric;
storing historical performance data for the first path and the second path based on the monitored network performance metric of the first path and the second path;
receiving a data flow associated with the application and directed to a destination network device;
determining whether the first path and the second path satisfy the service level agreement associated with the application;
selecting the first path or the second path based on the historical performance data for the first path and the historical data for the second path; and
routing the data flow associated with the application to the destination network device along the selected path, wherein the first path or the second path is selected in response to a determination that neither the first path nor the second path satisfy the service level agreement.

16. The one or more non-transitory computer readable media of claim 15, wherein the first path or the second path is selected based on a score associated with the historical performance data for the first path being higher than the score associated with the historical data for the second path.

17. The one or more non-transitory computer readable media of claim 15, wherein the network performance metric comprises jitter.

18. The one or more non-transitory computer readable media of claim 15, wherein the network performance metric comprises latency.

19. The one or more non-transitory computer readable media of claim 15, wherein the network performance metric comprises packet loss.

20. The one or more non-transitory computer readable media of claim 15, wherein the first path or the second path is selected by operations comprising:
   determining an aggregate historical performance for the first and the second paths;
   comparing the aggregate historical performance; and
   selecting the path with aa highest aggregated historical performance.

* * * * *